United States Patent
Bent et al.

(10) Patent No.: US 8,812,535 B2
(45) Date of Patent: Aug. 19, 2014

(54) PROPAGATING A QUERY IN A FEDERATED DATABASE

(75) Inventors: Graham A. Bent, Southampton (GB); Patrick Dantressangle, Chandlers Ford (GB); John B. Ibbotson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 12/203,719

(22) Filed: Sep. 3, 2008

(65) Prior Publication Data

US 2009/0077036 A1 Mar. 19, 2009

(30) Foreign Application Priority Data

Sep. 19, 2007 (GB) .................................... 0718251.2

(51) Int. Cl.
*G06F 7/06* (2006.01)
*G06F 17/30* (2006.01)

(52) U.S. Cl.
USPC .................................. 707/769; 707/E17.014

(58) Field of Classification Search
USPC .......................................... 707/622, 971, 769
See application file for complete search history.

(56) References Cited

U.S. PATENT DOCUMENTS

| | | | | |
|---|---|---|---|---|
| 6,226,649 B1 * | 5/2001 | Bodamer et al. | ............... | 709/203 |
| 7,174,382 B2 * | 2/2007 | Ramanathan et al. | ........ | 709/227 |
| 7,664,806 B1 * | 2/2010 | Koudas et al. | ................ | 707/899 |
| 7,716,174 B2 * | 5/2010 | Lee et al. | ...................... | 707/600 |
| 7,783,777 B1 * | 8/2010 | Pabla et al. | .................... | 709/238 |
| 7,987,152 B1 * | 7/2011 | Gadir | ............................. | 707/602 |
| 8,250,140 B2 * | 8/2012 | Bent et al. | ..................... | 709/204 |
| 2003/0208621 A1 * | 11/2003 | Bowman | ...................... | 709/242 |
| 2006/0031439 A1 * | 2/2006 | Saffre | ........................... | 709/223 |
| 2006/0259607 A1 * | 11/2006 | O'Neal et al. | ................ | 709/223 |
| 2006/0265396 A1 * | 11/2006 | Raman et al. | .................. | 707/10 |
| 2007/0083347 A1 * | 4/2007 | Bollobas et al. | ................ | 703/2 |
| 2008/0043634 A1 * | 2/2008 | Wang et al. | ................... | 370/252 |
| 2008/0263022 A1 * | 10/2008 | Kostorizos et al. | .............. | 707/5 |

OTHER PUBLICATIONS

Raghu Ramakrishnan, Database Management Systems (1998), published by WCB/McGraw-Hill, pp. 544-545, 554-556, 567-569.*

* cited by examiner

*Primary Examiner* — Shyue Jiunn Hwa
(74) *Attorney, Agent, or Firm* — Steven L. Nichols; Van Cott, Bagley, Cornwall & McCarthy P.C.

(57) ABSTRACT

A method for propagating a query in a system made up of a number connectable database management system nodes, where each node is associated at least one database, includes: selecting a first node from the number of nodes; generating at least one connection operable to propagate a query from the first node to a first subset of the number of nodes; generating at least one connection operable to propagate a query from a second node in the first subset to a second subset of the plurality of nodes; where at least one node in the second subset is different from nodes in the first subset.

20 Claims, 14 Drawing Sheets

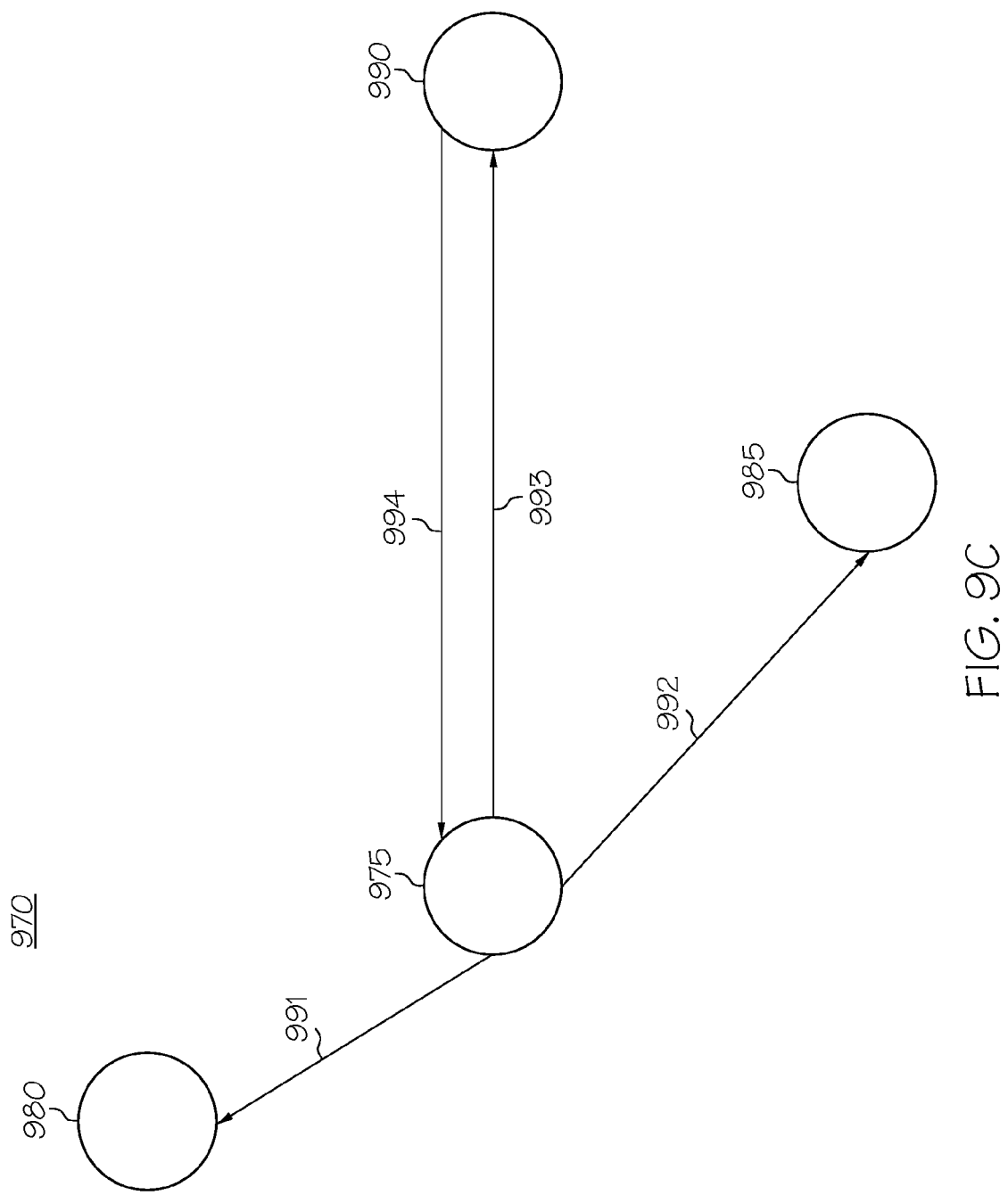

PROPAGATING A QUERY IN A FEDERATED DATABASE

GOVERNMENT LICENSE RIGHTS

The U.S. Government has a paid-up license in this invention and the right in limited circumstances to require the patent owner to license others on reasonable terms as provided for by the terms of W911NF-06-3-0001 awarded by the U.S. Army Research Laboratory.

BACKGROUND OF THE INVENTION

A federated database is made up of a number of interconnected database management systems (DBMSs), each of which manages one or more databases. The federated database allows a single query to access the databases through the interconnected DBMSs. The query is received by the federated database and propagated over connections between the various DBMSs. DBMSs that control databases targeted by the query then translate the query into actions that are compatible with the databases they control.

As the size of a database federation increases, various scaling problems can occur. For example, as new DBMSs are added to the federated database, the number of connections between the DBMSs may increase in a combinatorial fashion. This can lead to an unwieldy number of connections in a federated database that contains only a moderate number of DBMSs. Further, the network topology of the federated database may also lead to data that is inaccessible following the failure of a connection or DBMS. Additionally, when a query is made to the database federation, the communication overhead in distributing the query to all of the DBMSs can be significant.

BRIEF SUMMARY OF THE INVENTION

A method for propagating a query in a system made up of a number connectable database management system nodes, where each node is associated at least one database, includes: selecting a first node from the number of nodes; generating at least one connection operable to propagate a query from the first node to a first subset of the number of nodes; generating at least one connection operable to propagate a query from a second node in the first subset to a second subset of the plurality of nodes; where at least one node in the second subset is different from nodes in the first subset. A system for propagating a query in a federated database includes a plurality nodes, each the nodes including at least one database; a determiner which selects a first node of the plurality of nodes; a generator which generates at least one connection between the first node and a first subset of the plurality of nodes and generates at least one connections between a second node and a second subset of the plurality of nodes; wherein at least one node in the second subset is different from the nodes in the first subset.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 9C is a diagram of an illustrative database federation showing incoming and outgoing connections between nodes, according to one embodiment of principles described herein.

Throughout the drawings, identical reference numbers designate similar, but not necessarily identical, elements.

DETAILED DESCRIPTION OF THE INVENTION

Figure 1:
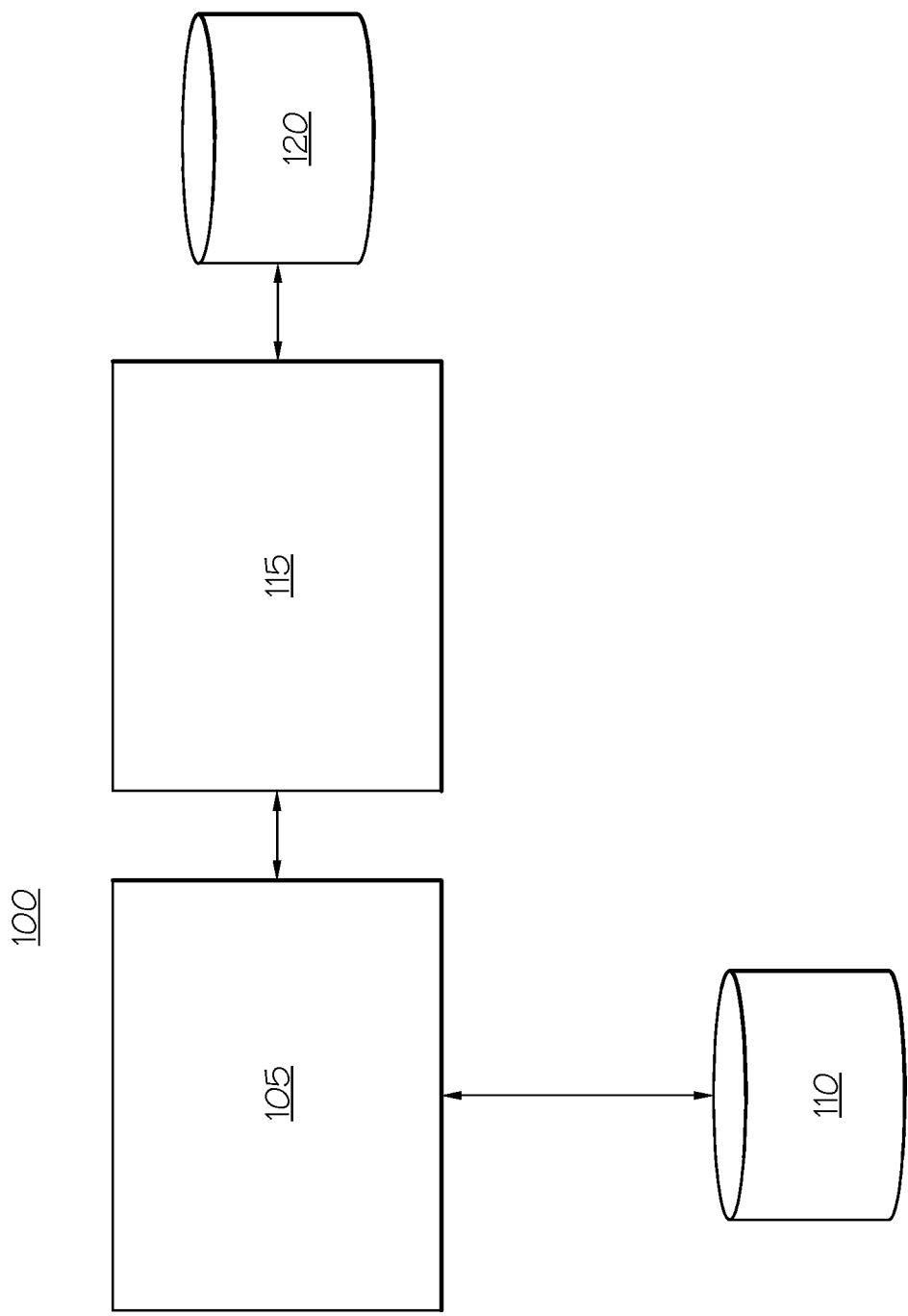
FIG. 1 is a block diagram of an illustrative a distributed database, according to one embodiment of principles described herein.

Computer databases are structured collections of data which are managed to meet the needs of a community of users. A computer database relies on software, called a database management system (DBMS), to manage the access and organization of the data. An organization may depend on a variety of computer databases which may not be natively compatible. For example, the various computer databases within an organization may use different operating systems, query languages, protocols, or data structures. To unify the various computer databases within an organization, a federated database can be formed. The federated database is a system in which the various DBMSs act as gateways through which the databases can be accessed using a single query. The DBMSs are interconnected to allow messages to be passed through the federated database. They also act as interpreters which translate the various queries into actions that are compatible with the databases they control.

As the size of a database federation increases, various scaling problems can occur. For example, as new DBMSs are added to the federated database, the number of connections between the DBMSs can increase in a combinatorial fashion. This can lead to an unwieldy number of connections in a federated database that contains only a moderate number of DBMSs. For example, a federated database system may use a connection topology that dictates that each DBMS must be connected to every other DBMS. If a new DBMS is added to a federated database that contains eight existing systems, the number of connections must increase by eight to allow the new DBMS to connect with each of the existing DBMSs. This combinatorial increase in connections can result in an inefficient and overly redundant communication topology. Additionally, in some network topologies the failure of a connection or DBMS may result in one or more databases becoming inaccessible.

Another scaling problem can arise during the distribution of communications through the communication network of a federated database. When a query is made to the database federation, the communication overhead in distributing the query to all of the DBMSs can be significant.

For example, when a query is made within the federated database, one or more DBMSs decompose the query into subqueries for submission to the relevant constituent DBMSs. Accordingly, as the size of the federation increases, the number of queries associated with obtaining data also increases. Additionally, when a new DBMS is to be added to the distributed database federation, each of the other existing DBMSs must be updated. This results in limited scalability and significant network and management overheads.

According to one illustrative embodiment, a module is added to each of the distributed databases which allows for the automatic connection of a new DBMS to a federated database or healing of the network after the loss of a connection or malfunction of a DBMS. The module implements a scale-free networking approach that uses a preferential attachment strategy. This preferential attachment strategy creates an efficient and robust network that utilizes a number of highly connected DBMSs that serve as hubs. However, all connections are not routed through the hubs. As directed by a number of parameters, connections are made which bypass the hubs and provide redundancy to the network topology. Further, to provide additional robustness within the system, data can be replicated within databases. Consequently, if a connection or DBMS is inoperative, the data can still be access on a redundant database.

In one illustrative embodiment, the method of making and transmitting a query throughout this scale-free network significantly reduces overhead. The query is independently evaluated by a receiving DBMS and propagated to other directly connected DBMSs. This propagation process continues for predetermined number of propagation cycles. This propagation process reduces the overhead associated with making a query. Rather than making a query to each individual DBMS, the originating DBMS "broadcasts" a query to directly connected DBMSs and then simply waits for responses. The query propagates through the federated database and DBMSs that have relevant data transmit this data to a designated recipient. Additionally, the replication strategy discussed above can increase the efficiency of the federated database by allowing data to be retrieved from more closely linked DBMSs which require fewer propagation cycles to reach.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

A typical distributed database configuration (100) is depicted in FIG. 1. A first database management system (DBMS) (105) is operable to access a first database (120) associated with a first back end computing system (115). The first DBMS (105) is also operable to access a second database (110) that is "local" to the first DBMS (105) (that is, the second database (110) is accessible using a direct connection). The database configuration (100) is termed "distributed" because the first DBMS (105) is operable to access multiple databases.

Figure 2:
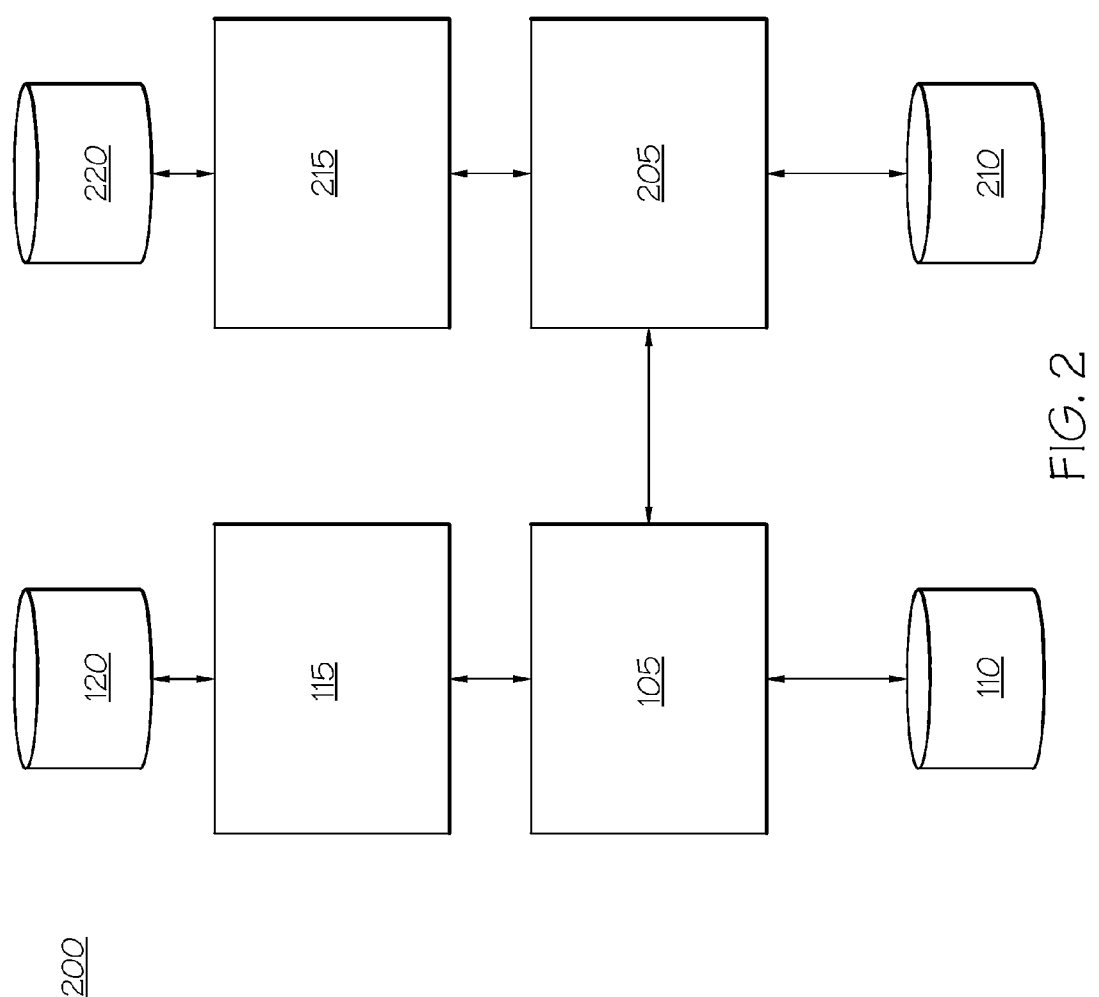
FIG. 2 is a block diagram of an illustrative a database federation, according to one embodiment of principles described herein.

FIG. 2 is an illustrative example of a distributed database federation (200). As discussed above, a database federation is a type of virtualized database that allows constituent database systems to remain autonomous but provides a uniform front-end user interface, enabling users to store and retrieve data in multiple noncontiguous databases with a single query. Database federations are typically comprised of a number of DBMSs and their associated local databases, backend systems, and backend databases. According to one exemplary embodiment, the first DBMS (105) is fully interconnected to each of the other DBMSs in the federation. For example, the first DBMS (105) is fully interconnected to a second DBMS (205). The second DBMS (205) is operable to access a second database (220) associated with a second back end computing system (215). The second DBMS (205) is also operable to access a second local database (210). The backend computing systems (115, 215) are typically heterogeneous and not interconnected with other backend computing systems. The DBMSs act as interpreters and intermediaries between the various databases and backend computing systems. Each of the DBMSs maintains robust interconnections with other DBMSs in the federation. Consequently, as the number of DBMSs in a distributed database federation increases, the number of connections between the DBMSs increases exponentially. When a query is made within the federated database, one or more DBMSs decompose the query into subqueries for submission to the relevant constituent DBMSs. Accordingly, as the size of the federation increases, the number of queries associated with obtaining data also increases. Additionally, when a new DBMS is to be added to the distributed database federation, each of the other existing DBMSs must be updated. This results in limited scalability and significant network and management overheads.

Figure 3:
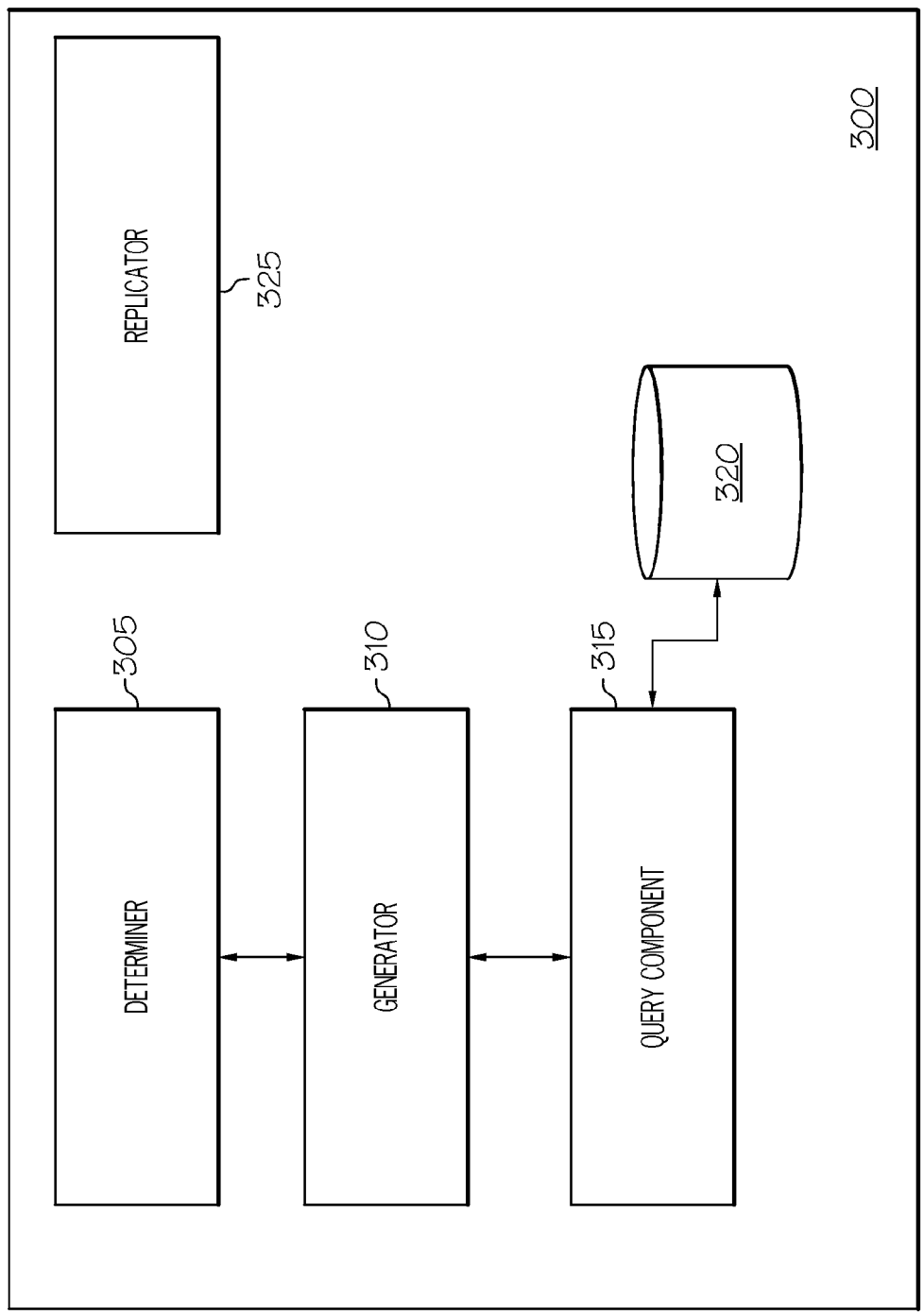
FIG. 3 is a block diagram of an illustrative an apparatus for propagating a query in a federated database, according to one embodiment of principles described herein.

FIG. 3 is an illustrative diagram showing an apparatus (300) according to one illustrative embodiment, wherein the apparatus (300) comprises a first determiner (305); a first generator (310); a query component (315) associated with a first storage component (320); and a replicator (325). The apparatus (300) is operable to communicate with a plurality of DBMSs. As discussed above, each DBMS is typically configured to access a one or more databases including local databases and backend databases. Within the various databases, a variety of data is stored. Typically, the data is stored in a table format with a number of rows and columns. Additionally, each database contains a logical table that allows a user to view (or update) the data in the table. The function of each of the components within the apparatus (300) is described below.

Figure 4:
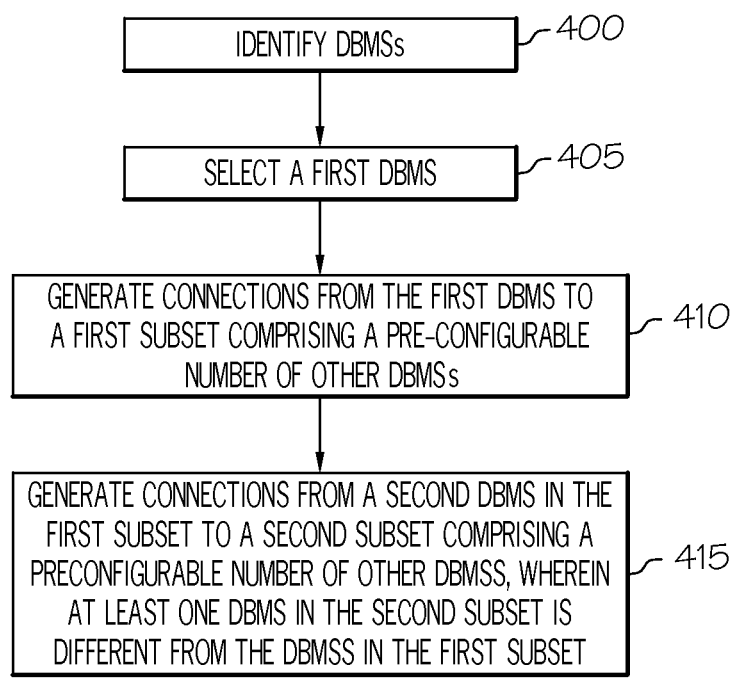
FIG. 4 is a flowchart of an illustrative method for connecting a new database management system to a federated database, according to one embodiment of principles described herein.

FIG. 4 is a flowchart showing one illustrative method for adding one or more DBMSs to a distributed database federation. In a first step, the determiner (305) identifies one or more DBMSs to be added to a distributed database federation (step 400). Next, the generator (310) selects a first DBMS (step 405) and integrates it into the database federation by connecting it to a first subset of DBMSs (step 410). According to one exemplary embodiment, the generator (310) obtains user input regarding which connections should be made between the first DBMS and the first subset of the remaining plurality of identified DBMSs. However, the first DBMS is not fully interconnected to all of the remaining plurality of identified DBMSs. Next, the generator (310) identifies a second DBMS from within the first subset of DBMSs and connects this second DBMS to a second subset of DBMSs, wherein the second subset comprises at least one DBMS which is not comprised in the first subset (step 415).

According to one illustrative embodiment, a preferential attachment network connection strategy is used. In the following discussion, the term "node" refers generally to a network element that is configured to make one or more connections with other network elements. In the embodiment below, the term "node" refers specifically to a DRMS within a federated database. In preferential attachment strategy, connections are made with network nodes according to how many connections a node already has. A node with more connections has a higher likelihood of being selected to receive additional connections. For example, a first node may query, in turn, a number of other nodes in order to determine a number of connections associated with each of the nodes. In response, the first node determines probabilistically one or more nodes to connect to. A probability of a second node being chosen is proportional to a number of connections the second node maintains. This results in a scale-free network that has a number of highly connected nodes known as hubs. In some embodiments, the number of hubs in relation to the number of non-hubs remains constant as a scale-free network changes in size.

In one embodiment, the first generator (310) uses an automatic connection strategy associated with scale-free networks termed preferential attachment. The first generator (310) queries, in turn, each of the remaining plurality of identified DBMSs in order to determine a first subset of the remaining plurality of identified DBMSs. For example, the first generator (310), queries, in turn, each of the remaining plurality of identified DBMSs in order to determine a number of connections associated with each of the remaining plurality of identified DBMSs. In response, the first generator (310) determines probabilistically a first subset of the remaining plurality of identified DBMSs that the first DBMSs should connect to.

Using the preferential attachment strategy, a probability of a DBMS being chosen for the first subset is proportional to a number of connections associated with the DBMS. As discussed above, this results in a number of highly connected DBMSs (known as hubs). According to one exemplary embodiment, the number of highly connected DBMSs in relation to the number of non-highly connected DBMSs remains constant as the distributed database federation changes in size.

Figure 9A:
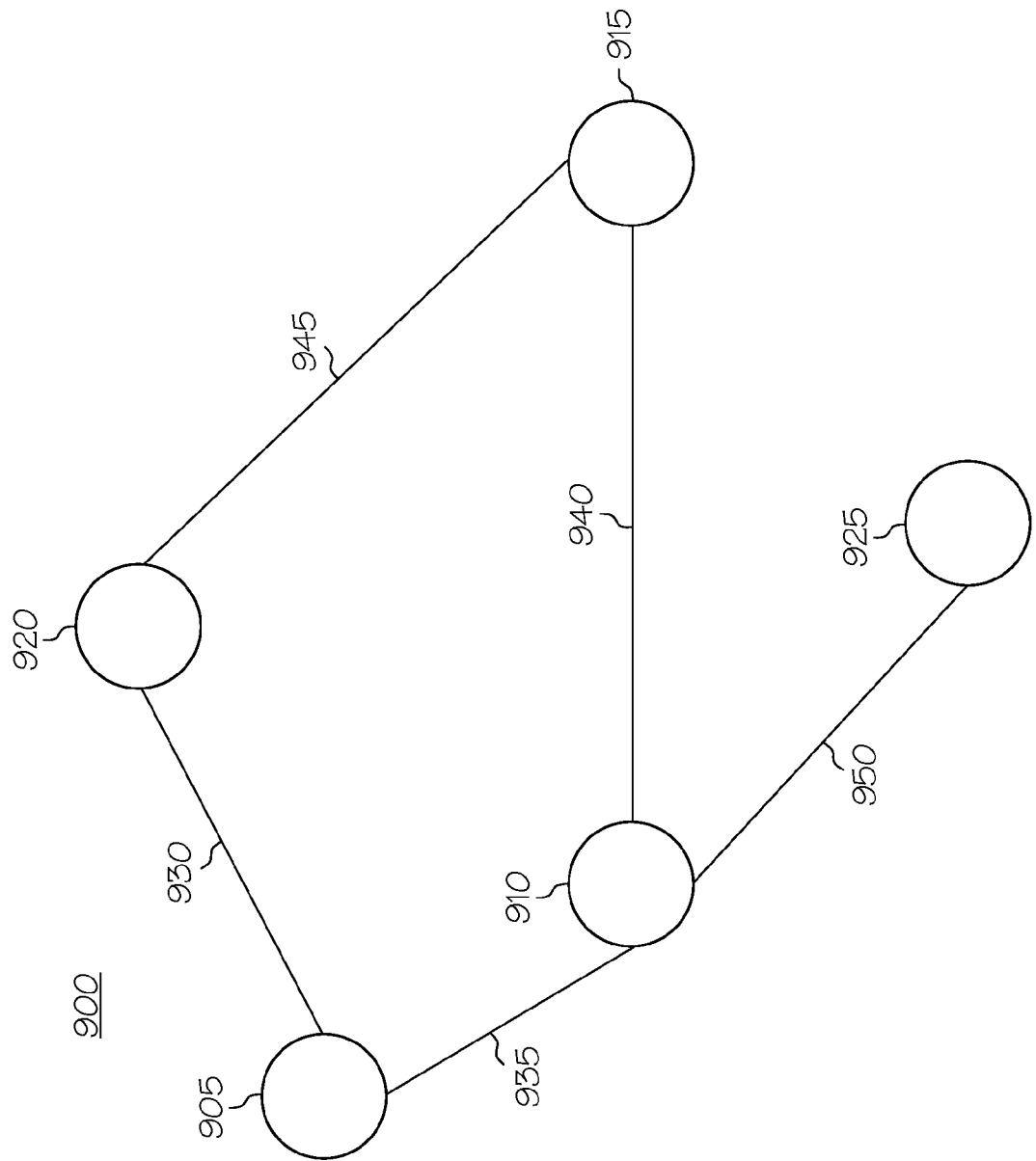
FIG. 9A is diagram of an illustrative database federation, according to principles described herein.

FIG. 9A depicts an overview of a network (900) comprising a number of nodes (905, 910, 915, 920 and 925) and connections (930, 935, 940, 945 and 950). Each node is associated with an apparatus (1000). A block diagram of the apparatus (1000) is shown in FIG. 10, wherein the apparatus (1000) comprises a second determiner (1005); a probabilistic component (1010) associated with a second storage component (1013) comprising probabilistic data; a second generator (1015); a transmitter (1020) and a receiver (1025).

Figure 10:
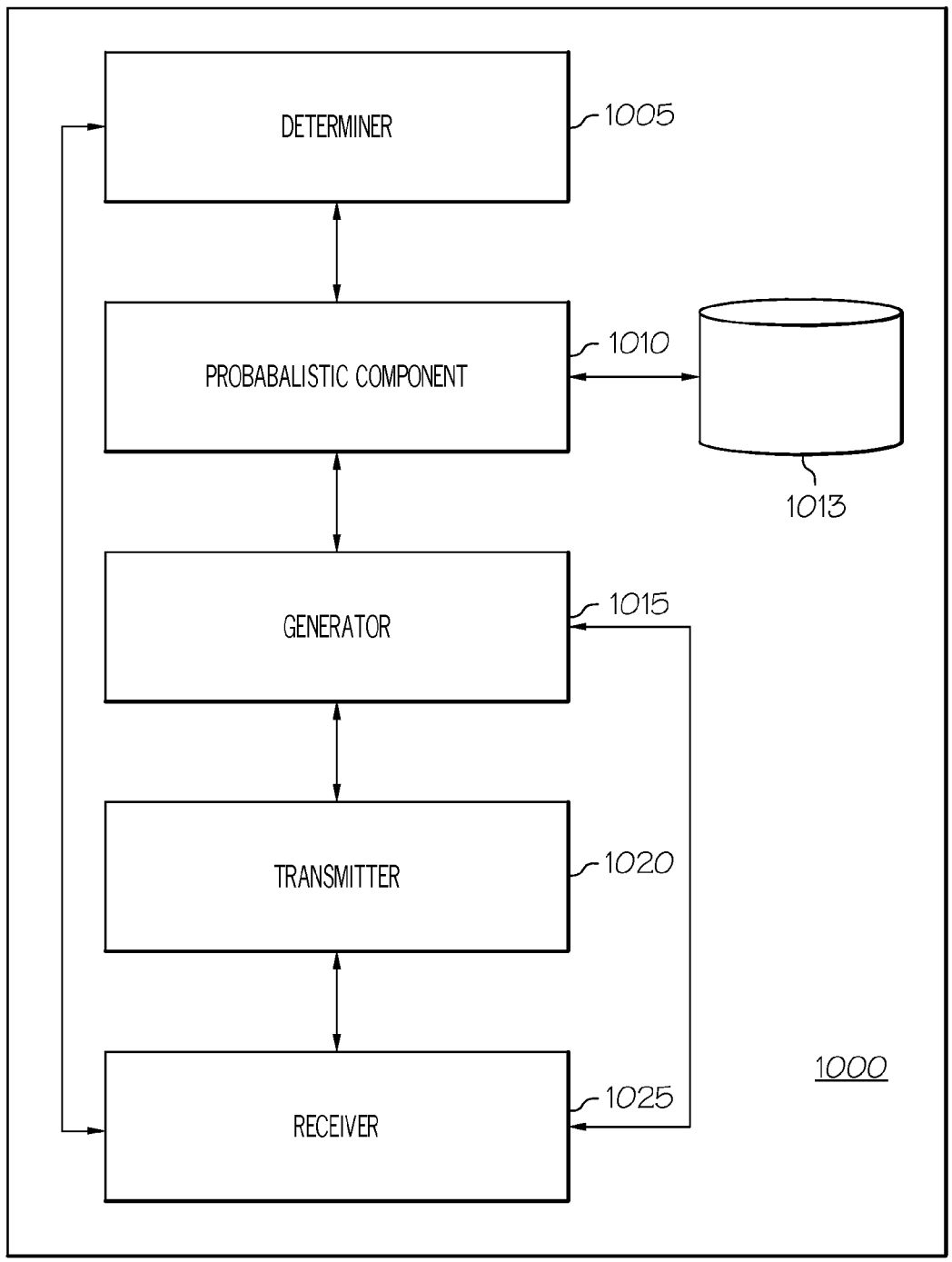
FIG. 10 is a block diagram of an illustrative apparatus for enabling connections between nodes in a database federation, according to one embodiment of principles described herein.
Figure 11:
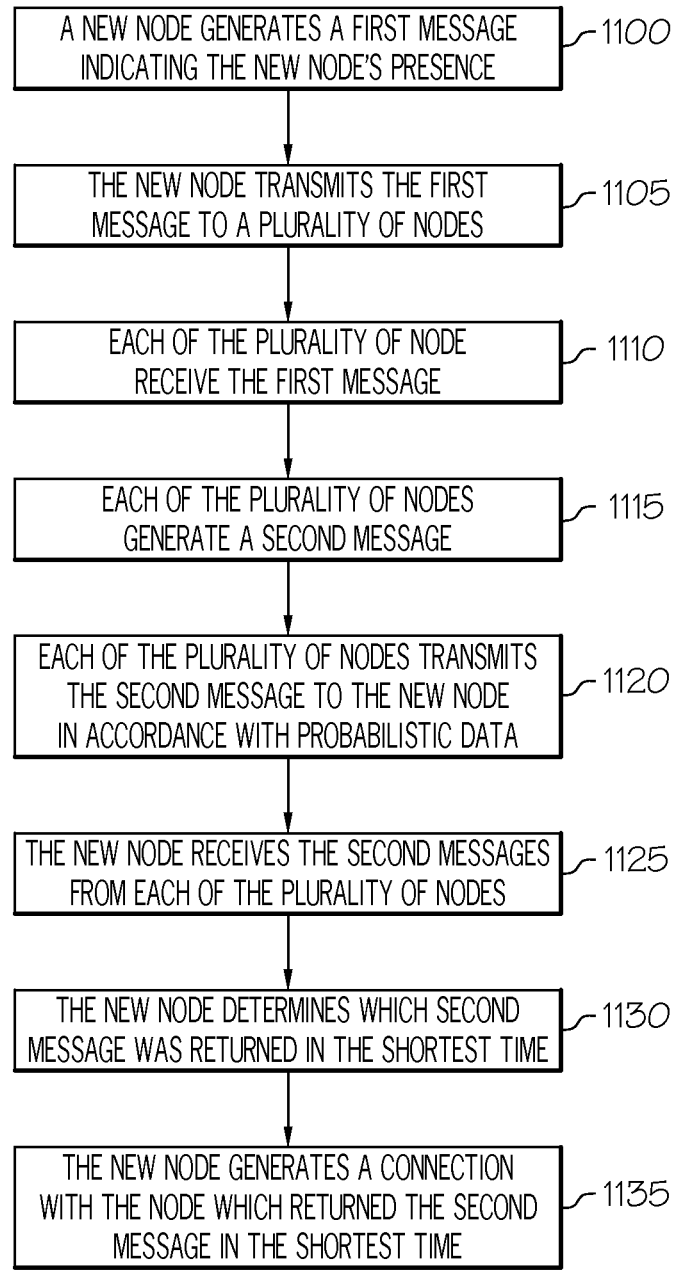
FIG. 11 is a flowchart of an illustrative method for creating new connections between nodes in a database federation, according to one embodiment of principles described herein.

FIG. 11 is a flowchart showing one illustrative method for incorporating one or more new nodes into an illustrative network shown in FIG. 9A and incorporating the illustrative apparatus shown in FIG. 10. With reference to FIG. 11, when a new node is to join the network (900), the second generator (1015) generates a first message (step 1100). The first message comprises an identifier associated with the new node and an indicator indicating that the new node wishes to join the network (900). The transmitter (1020) then transmits a copy of the first message to each of the nodes (905, 910, 915, 920 and 925) in the network (900) (step 1105). According to one embodiment, the messages are addressed and delivered using identifiers associated with each of the nodes (905, 910, 915, 920 and 925).

The receiver (1025) of each of the nodes (905, 910, 915, 920 and 925) receives a copy of the first message (step 1110). In response to receipt of a copy of the first message, the second determiner (1005) of a node determines a number of connections associated with the node. The second generator (1015) of a node then generates a second message indicating the availability of the node to make a connection with the new node and identifier associated with the node (step 1115). The second generator (1015) passes the second message to the transmitter (1020).

In the illustrative network shown in FIG. 9A, a first node (905) comprises two connections; a second node (910) comprises three connections; a third node (915) comprises two connections; a fourth node (920) comprises two connections and a fifth node (925) comprises one connection.

It should be understood that a number of connections associated with a node can be associated with, for example, the processing capability of the node. The second determiner (1005) passes data associated with the determined number of connections to the probabilistic component (1010). The probabilistic component (1010) of a node uses the data associated with the determined number of connections and probabilistic data stored in the second storage component (1013) to determine a value of a maximum time delay "$T_d$" that the node will wait before transmitting the second message to the new node.

The probabilistic data is shown below, wherein the value of "$T_d$" is inversely proportional to the number of connections ("$N_d$"). A value "$t_0$" is a constant used by every node:

$$T_d = t_0/N_d \quad \text{Equation 1}$$

In response to determining a value of "$T_d$", the probabilistic component (1010) determines a time delay "$t_d$" by randomly selecting a value between "0" and "$T_d$". Table 1 shows the number of connections for a given node and the associated values for the maximum time delay "$T_d$" when the constant to is equal to 12

TABLE 1

| Number of connections | Max. Time Delay "$T_d$" |
|---|---|
| 1 | 12 milliseconds |
| 2 | 6 milliseconds |
| 3 | 4 milliseconds |
| 4 | 3 milliseconds |

As discussed above, the probabilistic component then generates a random time delay in transmitting the message to the new mode that is between 0 and "$T_d$". Continuing with the example above, the first node (905) has two connections (930, 935) which results in a maximum time delay of 6 milliseconds (ms). The probabilistic generator then generates a random time delay between 0 milliseconds and 6 milliseconds. For illustration purposes, assume that the probabilistic generator of the first node (905) generates a time delay "$t_d$" of 3 ms. The other nodes similarly determine the total number of connections at the node, the maximum time delay, and generate a time delay "$t_d$". For example, the second node (910) has three connections (935, 940, 950), a maximum time delay of 4 milliseconds and generates an actual time delay "$t_d$" of 4 milliseconds; the third node (915) has two connections (940, 945), a maximum time delay of 6 milliseconds and generates an actual time delay "$t_d$" of 3 milliseconds; the fourth node (920) has two connections (930, 945) a maximum time delay of 6 milliseconds and generates an actual time delay "$t_d$" of 6 milliseconds; and the fifth node (925) has one connection (950), a maximum time delay of 12 milliseconds and generates an actual time delay "$t_d$" of 7 milliseconds.

The probabilistic component (1010) passes the value for "$t_d$" to the transmitter (1020). The transmitter (1020) transmits (step 1120) the second message in accordance with the value for "$t_d$". In the first example, a second message associated with the first node (905) is sent after a time delay of 3 ms; a second message associated with the second node (910) is sent after a time delay of 4 ms; a second message associated with the third node (915) is sent after a time delay of 3 ms; a second message associated with the fourth node (920) is sent after a time delay of 6 ms and a second message associated with the fifth node (925) is sent after a time delay of 7 ms.

Thus, a node with a higher number of connections responds probabilistically faster than a node with a lower number of connections. However, a random selection of "$t_d$" allows for a degree of randomness associated with the time of response. For example, a node with a higher number of connections may respond slower than a node with a lower number of connections.

According to one exemplary embodiment, the receiver (1025) of the new node receives each of the second messages. The second determiner (1005) then ranks the second messages according to criteria. For example, the second determiner (1005) of the new node ranks the second messages in accordance with a time value associated with receipt of the second messages. The second determiner (1005) uses the second messages to determine (step 1130) identifiers associated with a pre-configurable number of nodes having an associated second message that has a fastest time value associated with receipt. It should be understood that the pre-configurable number can be associated with pre-configurable number of connections that can be made to the new node. Typically, a time value associated with receipt is proportional to "$t_d$". However, due to differing delays associated with network connections and lost messages for example, a time value associated with receipt may not be proportional to "$t_d$". In the first example, the pre-configurable number is "1" and the identifier is associated with the second node (910) having an associated second message that has a fastest time value associated with receipt. In response to the determination, the second generator (1015) of the new node generates (step 1135) a connection to the second node (910).

The randomness introduced in the return time by the probabilistic generators and network delays provides for connections to be made with nodes other than the node with the most existing connections, thereby building a more robust network. For example, in the event that a hub node is inoperable, alternative routes exist to communicate with the remaining nodes.

Figure 9B:
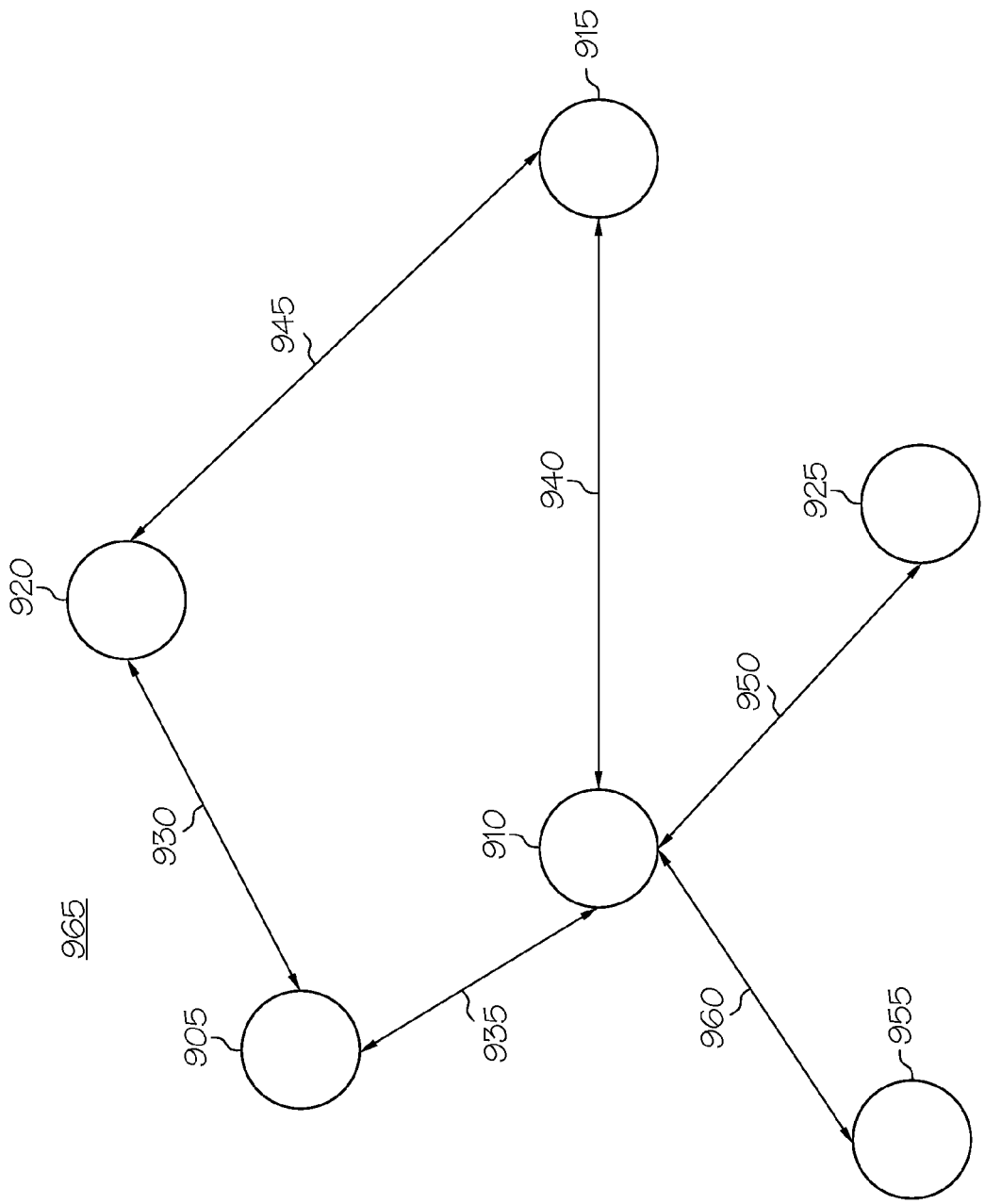
FIG. 9B is diagram of an illustrative database federation where a new node is connected to the database federation of FIG. 9A, according to principles described herein.

An overview of the network (965) is shown in FIG. 9B, wherein the new node (955) is connected to the second node (910) by a connection (960). The discussion above with reference to FIGS. 9, 10, and 11 is only one illustrative embodiment of a method for making a connection between various nodes in a federated database network. Other values, probabilistic methods, network elements, and communication strategies could be used. By way of example and not limitation, the connection process executed by the apparatus (1000) can also be used in the event that connection between two existing nodes fails.

According one illustrative embodiment, when a pre-configurable number of vertices have connected to the new node, a node that is yet to send a second message (e.g. because the node has a long time delay) is suppressed from sending the second message. Additionally a node may be adapted to maintain a configurable number ($n_{out}$) of "outgoing" connections. With reference to the network (970) in FIG. 9C and with reference to a first node (975), an outgoing connection is a connection that originates from the first node (975) to another node—e.g. connections 991, 992 and 993 to nodes 980, 985 and 990 respectively. In an example, the first node (975) is adapted to maintain three outgoing connections.

A node also has a configurable number ($n_{in}$) of "incoming" connections available for a new node to connect to the node. With reference to FIG. 9C and with reference to a first node (975), for example, the first node (975) has a maximum number of one incoming connection. In FIG. 9C, the incoming connection has been used (e.g. connection 994 from node 990).

If by making a connection to a new node, the sum of $n_{out}$ and $n_{in}$ is to be exceeded (that is, if the node has no further available connections), the node is suppressed from sending the second message. For example, the first node (975) has no further available connections as each of the three outgoing connections is used and the one incoming connection is also used. The first node (975) is suppressed from sending the second message.

The benefits of the apparatus and method for generating a connection described above include making a connection without requiring multiple queries to be issued. This reduces the network overhead associated with making connections and reduces the time to make a new connection or repair a broken connection. Furthermore, the apparatus and method is parallel in its nature, in that a new node need not query each existing node in turn. Rather, the new node "broadcasts" a first message. Consequently, the apparatus and method can be used in the generation of scale-free networks.

The probabilistic connection strategy favors connections to a node with a higher number of connections (e.g. wherein the node has a higher processing capability). However, because the random selection of the actual time delay "$t_d$", network communication delays, and lost messages, a node with a higher number of connections may respond slower than a node with a lower number of connections. Thus, a highly connected node may not always be the node to which a connection is generated, resulting in a fairer connection strategy and a more robust network topology. Additionally, the inherent bias of the method toward more capable nodes and nodes with faster communication times streamlines the network.

Figure 5:
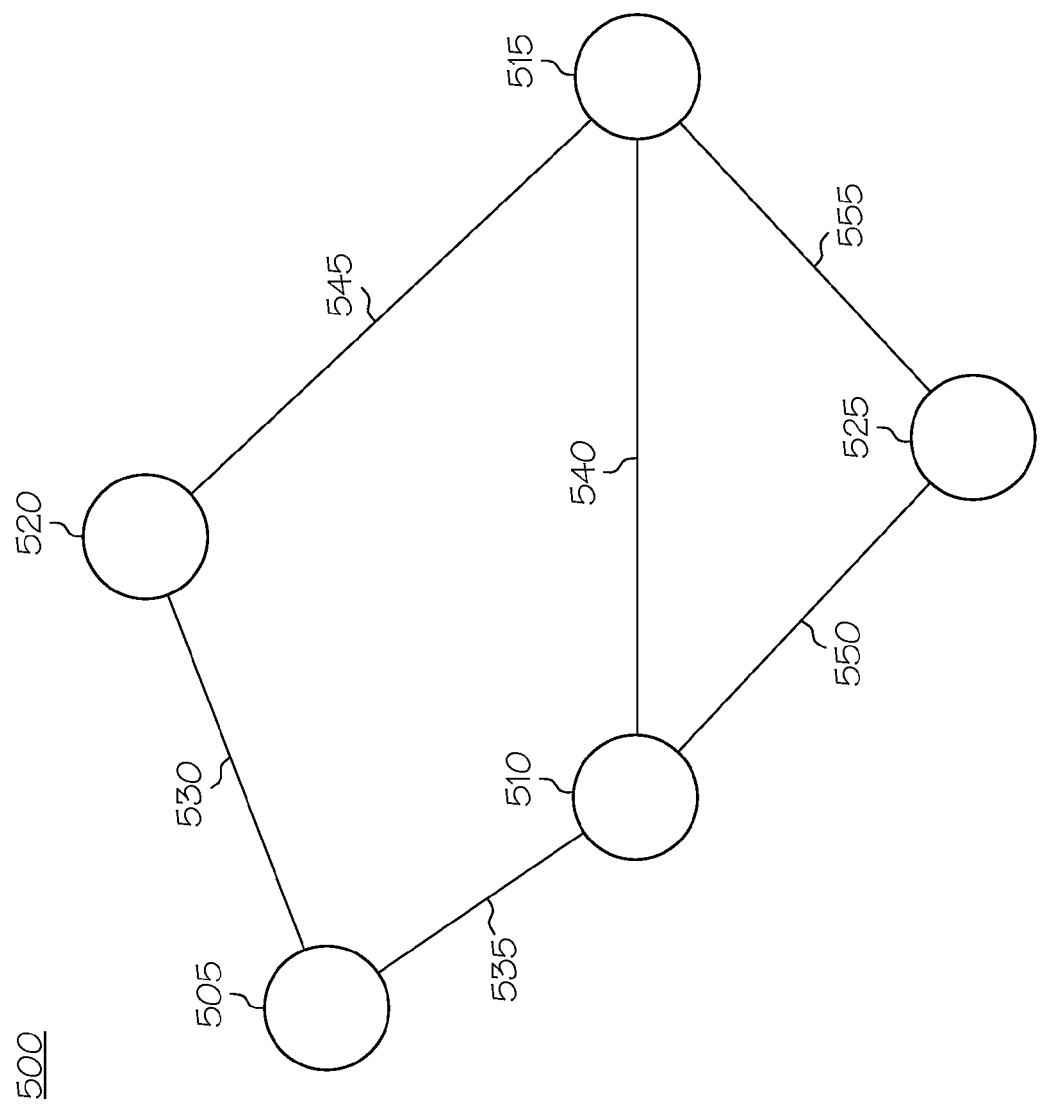
FIG. 5 is a diagram of an illustrative database federation, according to one embodiment of principles described herein.

With reference to one illustrative embodiment herein, an example of a resulting distributed database federation (500) is shown in FIG. 5. For example, a first DBMS (525) connects bi-directionally (wherein a bi-directional connection allows one DBMS to communicate with another and vice versa) to a first subset comprising a second DBMS (510) and a third DBMS (515). The third DBMS (515) connects bi-directionally to a second subset comprising the first DBMS (525) and a fourth DBMS (520). The fourth DBMS (520) connects bi-directionally to a third subset comprising the third DBMS (515) and a fifth DBMS (505). Thus, for example, although the first DBMS (525) and the fourth DBMS (520) are not directly connected, the first DBMS (525) is indirectly connected to the fourth DBMS (520) via the third DBMS (515).

According to one exemplary embodiment, the first DBMS (525) contains a combined logical table that allows it to index and address database contents that are accessible through its connection within the federated database. For example, the combined logical table may be a combination of: a first logical table of a first database comprised on a back end computing system connected to the first DBMS (525); a second logical table of a local database of the first DBMS (525); a third logical table of a second database comprised on a back end computing system connected to the second DBMS (510); a fourth logical table of a local database of the second DBMS (510); a fifth logical table of a third database comprised on a back end computing system connected to the third DBMS (515) and a sixth logical table of a local database of the third DBMS (515). The back end computing systems, associated databases, and local databases have not been shown for clarity.

Likewise, a combined logical table of the third DBMS (515) is associated with logical tables of databases comprised on back end computing systems connected to the first DBMS (525), the third DBMS (515) and the fourth DBMS (520) and logical tables of local databases of the first DBMS (525), the third DBMS (515) and the fourth DBMS (520). Similarly, an associated logical table of the fourth DBMS (520) is associated with logical tables of databases comprised on back end computing systems connected to the third DBMS (515), the fourth DBMS (520) and the fifth DBMS (505) and logical tables of local databases of the third DBMS (515), the fourth DBMS (520) and the fifth DBMS (505).

In the resulting distributed database federation, it is possible for a user who queries an associated logical table of the first DBMS (525) to access data from any database in the distributed database federation, without requiring each DBMS in the federation to be directly connected to each of the other DBMSs in the federation. For example, the user may request through the first DBMS (525) a data item from a logical database connected to the fourth DBMS (520). The first DBMS (525) lacks a direct connection with the fourth DBMS (520) but can access a logical table indexing the logical database connected to the fourth DBMS (520) through the third DBMS (515). Further, the query from the first DBMS (525) to the fourth DBMS (520) and the response can be passed through two redundant paths.

Figure 6A:
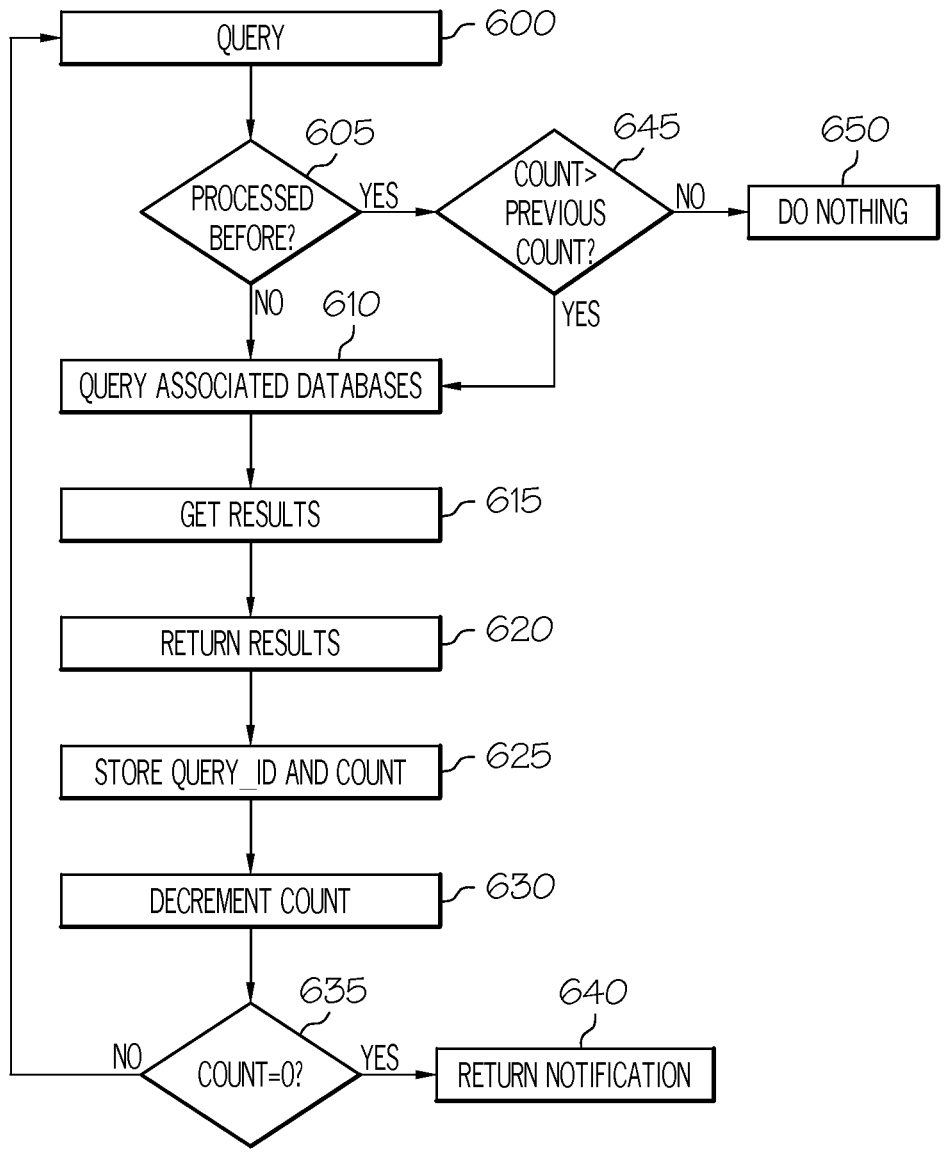
FIG. 6A is a flowchart of an illustrative method for propagating a query within a database federation, according to one embodiment of principles described herein.

FIG. 6A is a flowchart of an illustrative method for propagating a query within a database federation. According to one embodiment, a query comprises an associated query identifier (e.g. a parameter "QUERY_ID" having an associated value). According to one illustrative embodiment, a query comprises an associated count value (e.g. denoted by the parameter "COUNT" and its associated value). An initial value of "COUNT" is associated with a maximum number of times a query is propagated from one DBMS to and another DBMS. A single propagation of a query is a propagation from one DBMS to another directly connected DBMS (in either direction). The count value is decremented with each propagation cycle. For example, the value of "COUNT" is "2".

At step 600, a user initiates a query of the first DBMS (525) (termed herein as "an originating DBMS") using the query component (315). In the first example, the query is associated with finding employees for company X in Europe.

The query component (315) uses the associated query identifier (e.g. "QUERY_1") to determine (step 605) whether the query has been processed before by the first DBMS (525). In the first example, the query has not been processed before by the first DBMS (525). In response, the query component (315) queries (step 610) databases associated with the first database. By way of example and not limitation these databases may comprise a database on a back end computing system connected to the first DBMS (525) and the local database of the first DBMS (525).

The query component (315) then obtains the results (step 615) and transmits (step 620) the results to the user. The query component (315) stores (step 625) the query identifier (e.g. "QUERY_1") and a current value for "COUNT" (e.g. "2") in the first storage component (320). The query component (315) decrements (step 630) the current value for "COUNT", wherein the resulting value for "COUNT" is "1". At step 635, the query component (315) determines whether the decremented value for "COUNT" is zero. In the current example, the query component (315) determines that the decremented value for "COUNT" is not zero (e.g. because the value for "COUNT" is "1"). In response, the query component (315) propagates (step 600) the query to one or more of the remaining the DBMSs in the first set (i.e. one or more DBMSs directly connected to the first DBMS (525)).

As illustrated in FIG. 5, the query component (315) propagates (step 600) the query to each of the second DBMS (510) and the third DBMS (515). Within the second DBMS (510), the query component uses the associated query identifier (e.g. "QUERY_1") to determine (step 605) whether the query has been processed before by the second DBMS (510). In the current example, the query has not been processed before by the second DBMS (510). Consequently, the query component associated with the second DBMS (510) queries (step 610) the second database comprised on a back end computing system connected to the second DBMS (510) and the local database of the second DBMS (510).

The query component (315) obtains the results (step 615) and transmits (step 620) the results to the user. The query component (315) stores (step 625) the query identifier (e.g. "QUERY_1") and a current value for "COUNT" (e.g. "1") in the first storage component within the second DBMS (510). The query component (315) decrements (step 630) the current value for "COUNT", wherein the resulting value for "COUNT" is "0".

At step 635, the query component (315) determines whether the decremented value for "COUNT" is zero. In the current example, the query component (315) determines that the decremented value for "COUNT" is zero. This means that the query has been propagated to a maximum value of "COUNT". In response, a notification is transmitted (step 640) by the query component (315) to the user.

A similar process is followed by the third DBMS (515) upon receiving the query. For example, the query component within the third DBMS uses the associated query identifier (e.g. "QUERY_1") to determine (step 605) whether the query has been processed before by the third DBMS (515). The query has not been processed before by the third DBMS (515), so the query component queries (step 610) the databases controlled by the third DBMS (515), obtains the results (step 615) and transmits (step 620) the results to the user. The query component stores (step 625) the query identifier (e.g. "QUERY_1") and a current value for "COUNT" (e.g. "1") in the first storage component (320). The query component then decrements (step 630) the current value for "COUNT", wherein the resulting value for "COUNT" is "0". At step 635, the query component determines that the decremented value for "COUNT" is zero and transmits a notification is transmitted (step 640) by the query component (315) to the user. Consequently, the query component (315) propagates the query to one or more of the remaining DBMSs in the distributed database federation (500) until the decremented value for "COUNT" is zero.

With reference to step 605, if the query has been processed before by the first DBMS (525), the query component (315) determines (step 645) whether a current value of "COUNT" is more then a stored value of "COUNT". If the current value of "COUNT" is more then a stored value of "COUNT", the process passes to step 610 onwards as a further propagation of a query can occur. If the current value of "COUNT" is not more then a stored value of "COUNT", the first DBMS (525) has already received the query from another DBMS. According to one illustrative embodiment, no further action is taken (step 650). Thus, the query is not propagated on.

In this way the querying process exploits the way in which DBMSs in the distributed database federation are connected (that is, wherein a first DBMS is connected to a first subset comprising a pre-configurable number of other DBMSs; wherein a second DBMS in the first subset is connected to a second subset comprising a pre-configurable number of the remaining plurality of identified DBMSs and wherein the second subset comprises at least one DBMS which is not comprised in the first subset.)

The breadth of the search for the desired data within the distributed database federation can be controlled using the "COUNT" value. In this illustrative embodiment, the value of the "COUNT" indicates the number of degrees of separation between the originating DBMS and the last group of DBMSs to act on the query. In this context a single degree of separation is from one DBMS to another directly connected DBMS (in either direction). Each time the query is propagated over another degree of separation, the "COUNT" is decremented until the "COUNT" reaches zero and the propagation halts. Consequently, the resources and bandwidth needed to support the query method described above scales logarithmically rather than combinatorially, thereby reducing the required effort to make a query within the database federation.

It should be understood that a DBMS can be added or removed from the federation. As a result, only the DBMSs to which a DBMS is added or removed from need be re-configured and network and management overhead is reduced when reconfiguring the database federation.

Figure 6B:
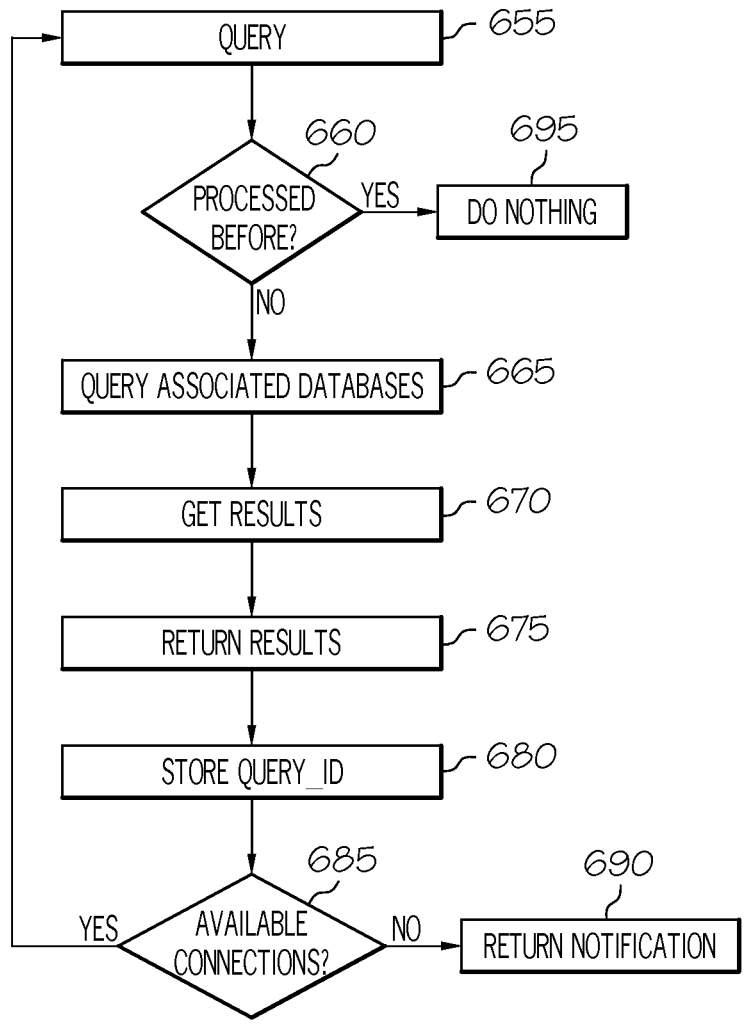
FIG. 6B is a flowchart of an illustrative method for propagating a query within a federated database, according to one embodiment of principles described herein.

The method and system described above for propagating a query is only one illustrative embodiment of the principles described herein. FIG. 6b is a flowchart illustrating an alternative process for propagating a query within a database federation. According to one embodiment, a query comprises an associated query identifier (e.g. a parameter "QUERY_ID" having an associated value). At step 655, a user initiates a query of the first DBMS (525) using the query component (315). The query component (315) uses the associated query identifier (e.g. "QUERY_2") to determine (step 660) whether the query has been processed before by the first DBMS (525).

If the query has not been processed before by the first DBMS (525), the query component (315) queries (step 665) the first database comprised on a back end computing system connected to the first DBMS (525) and the local database of the first DBMS (525). The query component (315) obtains the results (step 670) and transmits (step 675) the results to the user. The query component (315) stores (step 680) the query identifier (e.g. "QUERY_2") in the first storage component (320). At step 685, the query component (315) determines whether the first DBMS (525) has any connections to further DBMSs.

Again following the database federation network of FIG. 5, the query component (315) determines that the first DBMS (525) has a connection to the second DBMS (510) and a connection to the third DBMS (515). In response, the query component (315) propagates (step 655) the query to one or more of the remaining the DBMSs in the first set (i.e. one or more DBMSs directly connected to the first DBMS (525)). In the network illustrated in FIG. 5, for example, the query component (315) propagates (step 600) the query to each of the second DBMS (510) and the third DBMS (515).

The query component (315) uses the associated query identifier (e.g. "QUERY_2") to determine (step 660) whether the query has been processed before by the second DBMS (510). For example, the query component (315) may determine (step 660) that the query has been processed before by the second DBMS (510). This may be because a query propagated to the third DBMS (515) was processed and propagated to the second DBMS (510) before the query propagated from the first DBMS (525) reached the second DBMS (510). In response, no further action is taken (step 695). Consequently, the query is not processed again at the second DBMS (510), which improves processing overheads and conserves network bandwidth. Rather, the query can be propagated to remaining DBMSs (e.g. DBMSs 520 and 505) from the third DBMS (515).

Figure 7:
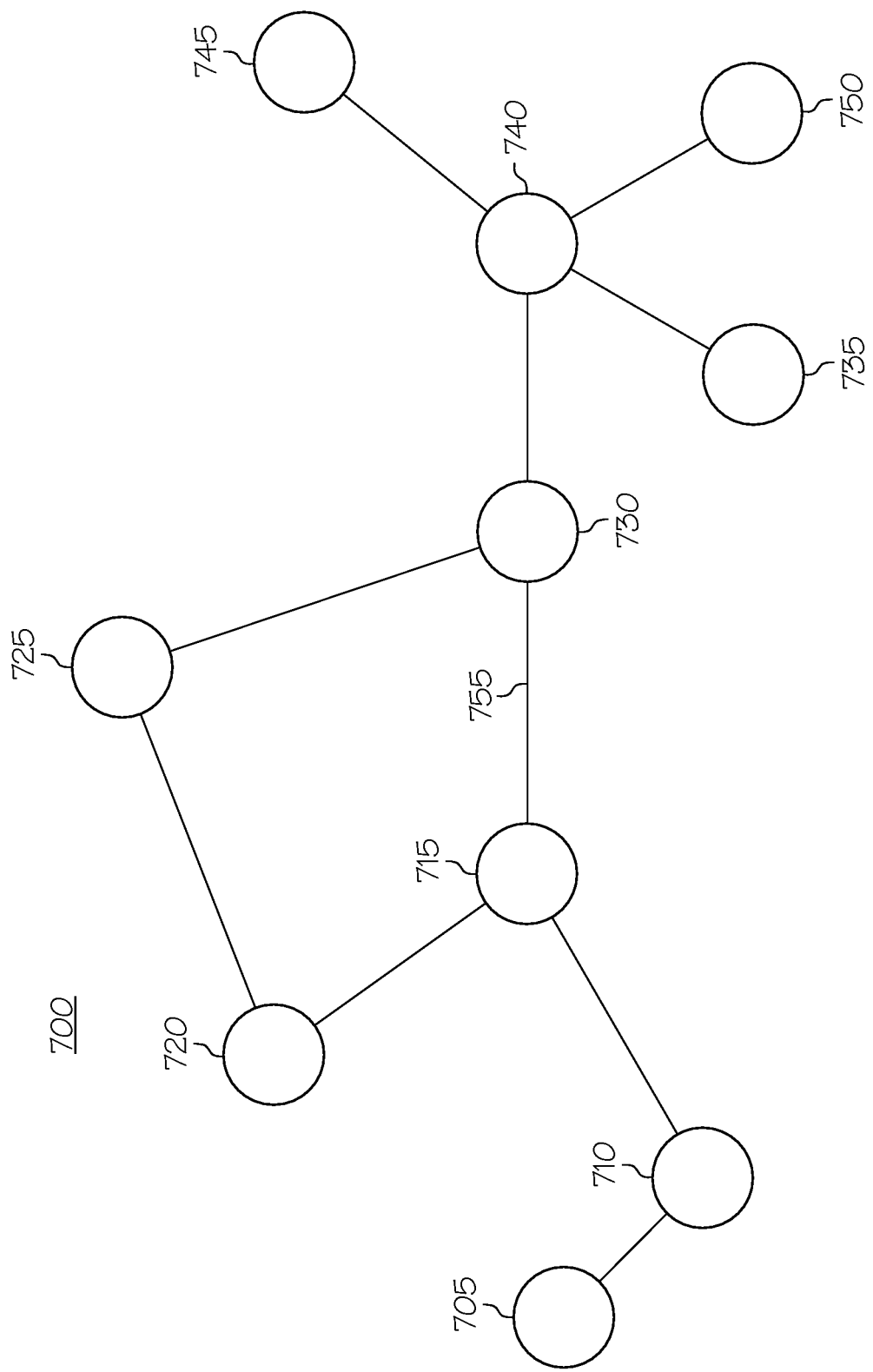
FIG. 7 is a flowchart of an illustrative database federation, according to one embodiment of principles described herein.

The resiliency of a network refers to the ability of the network to deliver the desired performance despite malfunctions within various components of the network. In a federated database resilience can be improved by replicating data over a number of nodes. The need for additional resiliency is illustrated using the database federation (700) illustrated in FIG. 7. For purposes of explanation, the distributed database federation (700) operates under a general rule that a query is to be propagated a maximum of six times from an originating DBMS (705) to another DBMS (e.g. wherein a single propagation of a query is a propagation from one DBMS to another directly connected DBMS). A particular query is made from the originating DBMS with the instructions that query is to be propagated only five times (that is, one less than the maximum number of times). If the objective is query a target DBMS (705), the query may passes from the originating DBMS (705) to DBMS 710; DBMS 715; DBMS 730 and DBMS 740 to the target DBMS (750).

However, if a connection (755) fails, the query will be unsuccessful. This is because, by propagating the query five times, the query cannot reach the target DBMS (750). Even if the query is propagated six times from an originating DBMS (705), the query only reaches DBMS 740 (that is, the query passes from the originating DBMS (705) to DBMS 710; DBMS 715; DBMS 720; DBMS 725; DBMS 730 and DBMS 740).

Figure 8:
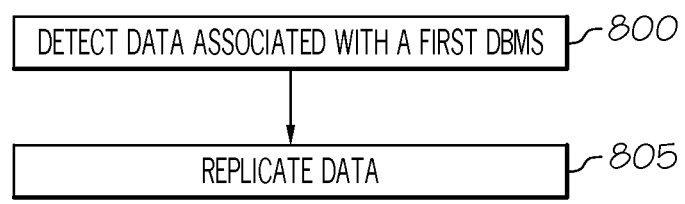
FIG. 8 is a flowchart of an illustrative method for replicating data within a database federation, according to one embodiment of principles described herein.

According to one exemplary embodiment, the resiliency of the network can be improved to allow data to be accessed in the event that a node or connection is lost. FIG. 8 is a flowchart of an illustrative method for replicating data within a database federation. In a first step, the replicator (325) detects that data is stored in one or more databases (step 800) associated with a first DBMS (750). At step 805, the replicator (325) obtains the data and replicates the data to a number of other databases associated with other DBMSs. In the example, the data is replicated to databases associated with DBMSs 735, 740 and 745.

Thus, if connection 755 fails, the query will still be successful if propagated six times, that is, the query passes from originating DBMS (705) to DBMS 710; DBMS 715; DBMS 720; DBMS 725; DBMS 730 and DBMS 740 (wherein the latter DBMS 740 comprises one or more databases that stores the replicated data).

According to one illustrative embodiment, data is replicated to a selectable number of other DBMSs such that there is an alternative path over which a query can be issued. As data is replicated to a number of other DBMSs, the data can still be accessed in light of a failure of a connection or a DBMS. Thus, resilience of the federated database is improved.

Furthermore, even if connection 755 does not fail, the data can be reached by propagating a query four times, rather than five as described above. That is, the query passes from originating DBMS (705) to DBMS 710; DBMS 715; DBMS 730 and DBMS 740 (wherein the latter DBMS 740 comprises one or more databases that stores the replicated data). Thus, the query time is reduced.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for adding a new node in a system comprising a plurality of connectable database management system nodes, each of said database management system nodes comprising at least one database, the method comprising:
    with a first node of said plurality of nodes, receiving a message requesting to add said new node to said system;
    with said first node, propagating a query relating to said message to a number of other nodes, wherein said query is associated with a query identifier;
    with said first node, generating a maximum delay time to wait before sending a second message, said maximum delay time being inversely proportional to a number of existing connections between said first node and other nodes within said plurality of nodes;
    with said first node, generating a second message in response to said new node after waiting a delay time, said delay time being a randomly selected time between 0 and said maximum delay time; and
    with said first node, forming a connection with said new node when said second message from said first node to said new node is a first message returned to said new node by any of said plurality of nodes.

2. The method of claim 1, wherein said new node does not form a direct connection with each of said plurality of nodes in said system.

3. The method of claim 1, further comprising:
    with a node receiving said query, using said query identifier to determine when the query has previously been processed by said node, in which said node receiving said query comprises the first node, another node from the plurality of nodes, or combinations thereof.

4. The method of claim 3, further comprising querying a database of said node receiving said query when said node has not processed said query before.

5. The method of claim 3, further comprising taking no action with said node receiving said query when said node determines that said node has already processed said query.

6. The method of claim 1, further comprising replicating data from a database associated with one of said plurality of nodes to a number of other databases associated with a number of other nodes of said plurality of nodes.

7. The method of claim 1, further comprising transmitting said second message to said new node after said delay time has expired.

8. The method of claim 1, wherein said new node previously had a connection to any node of said plurality of nodes in said system, but said connection failed, said message requesting to add said new node to said system being a mechanism to overcome said failed connection.

9. The method of claim 1, wherein said first node is assigned a maximum number of available connections, said method further comprising suppressing said first node from sending said second message when said connection with said new node would exceed said maximum number of available connections for said first node.

10. The method of claim 1, further comprising assigning a count to said query which is updated during propagation of said query within said system to indicate a number of degrees of separation between said first node originating said query and said other node receiving the propagated query.

11. The method of claim 1, further comprising suppressing transmission of said second message in response to a pre-configurable number of connections of said first node being unavailable for connection to said new node.

12. The method of claim 1, further comprising, with said new node, determining, in response to receipt of said second message, a time value associated with said receipt of said second message.

13. The method of claim 12, further comprising:
    ranking said second message in accordance with said time value.

14. The method of claim 13, further comprising associating a highest rank with a fastest said time value.

15. The method of claim 14, further comprising generating a connection from said new node to any node of said plurality of nodes, the new node being selected in accordance with a determined rank.

16. A system for propagating a query in a federated database comprising:
    a node of said federated database, said node comprising a computing device comprising at least one processor, said at least one processor being configured to implement:
    a query component for receiving and propagating a query, wherein a propagation of said query is a transmission of said query from a first node to another directly connected node, and wherein said query is associated with a counter to track a maximum count value;
    said query component, upon receipt of a query, being configured to use a query identifier associated with said query to determine whether said query has been previously processed by said query component; wherein said query component will ignore said query when said query component has already previously processed said query;
    in which said query relates to a connection established using multiple messages separated by a delay time, said delay time being a randomly selected time between 0 and a maximum delay time, said maximum delay time being inversely proportional to a number of existing connections between said first node and other nodes within said federated database.

17. The system of claim 16, wherein said at least one processor being further configured to implement:
    a determiner configured to select a second node from a plurality of connectable database management system nodes with which to form a connection based on which of said plurality of nodes most quickly responds to a connection message, each of said database management system nodes comprising at least one database.

18. The system of claim 16, wherein said query is associated a counter configured to track when a total number of times said query has propagated through said plurality of nodes equals a maximum count value.

19. The system of claim 18, wherein said maximum count value is six.

20. A computer program product for propagating a query in a federated database, the computer program product comprising:

a tangible computer usable storage medium having computer usable program code embodied therewith, the computer usable program code comprising:
  computer usable program code configured to automatically make connections between nodes within a federated database using preferential attachment, said preferential attachment being modified by a random factor and network characteristics; and
  computer usable program code configured to transmit a query within said federated database, said query being independently evaluated by a receiving node and rebroadcast to directly connecting nodes until a propagation cycle counter expires and wherein said query is associated with a counter to track a maximum count value;
in which said connections are made using multiple messages separated by a delay time, said delay time being a randomly selected time between 0 and a maximum delay time, said maximum delay time being inversely proportional to a number of existing connections between said nodes.

\* \* \* \* \*